US008631192B2

(12) United States Patent
Cho

(10) Patent No.: US 8,631,192 B2
(45) Date of Patent: *Jan. 14, 2014

(54) MEMORY SYSTEM AND BLOCK MERGE METHOD

(71) Applicant: Samsung Electronics Co., Ltd., Suwon-si (KR)

(72) Inventor: Yul-Won Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,773

(22) Filed: Jan. 31, 2013

(65) Prior Publication Data

US 2013/0145087 A1    Jun. 6, 2013

Related U.S. Application Data

(63) Continuation of application No. 12/396,004, filed on Mar. 2, 2009, now Pat. No. 8,375,158.

(30) Foreign Application Priority Data

Feb. 29, 2008 (KR) .................. 10-2008-0019258

(51) Int. Cl.
*G06F 12/00* (2006.01)

(52) U.S. Cl.
USPC .................. 711/103; 711/E12.008

(58) Field of Classification Search
USPC ............................................. 711/103
See application file for complete search history.

(56) References Cited

U.S. PATENT DOCUMENTS

| 5,420,983 | A  | 5/1995  | Noya et al.     |
| 6,742,081 | B2 | 5/2004  | Talagala et al. |
| 2002/0184436 | A1 | 12/2002 | Kim et al.   |
| 2006/0179236 | A1 | 8/2006  | Shafi         |
| 2007/0186032 | A1 | 8/2007  | Sinclair et al. |
| 2008/0098195 | A1 | 4/2008  | Cheon et al.  |
| 2008/0120488 | A1 | 5/2008  | Woo et al.    |

FOREIGN PATENT DOCUMENTS

| JP | 2002032256 A    | 1/2002 |
| KR | 100706808 B1    | 4/2007 |
| KR | 100725410 B1    | 5/2007 |
| KR | 1020070068807 A | 7/2007 |
| KR | 1020070088102 A | 8/2007 |

*Primary Examiner* — Reginald Bragdon
*Assistant Examiner* — Aracelis Ruiz
(74) *Attorney, Agent, or Firm* — Volentine & Whitt, PLLC

(57) ABSTRACT

In one embodiment, the invention provides a memory system including a flash memory device including a plurality of memory blocks implementing a plurality of data blocks, a plurality of log blocks, and a plurality of free blocks. The memory system further includes a flash translation layer maintaining the number of the free blocks to be at least equal to a reference number by converting selected memory blocks among the data and log blocks into free blocks via at least one merge operation during a background period. Additionally, the flash translation layer converts selected ones of the free blocks into data and log blocks, respectively.

10 Claims, 7 Drawing Sheets

MEMORY SYSTEM AND BLOCK MERGE METHOD

CROSS-REFERENCE TO RELATED APPLICATIONS

This is a Continuation application of U.S. application Ser. No. 12/396,004, filed Mar. 2, 2009, now U.S. Pat. No. 8,375,158, issued Feb. 12, 2013, which claims priority under 35 U.S.C §119 to Korean Patent Application No. 10-2008-0019258 filed on Feb. 29, 2008, the subject matter of which is hereby incorporated by reference.

BACKGROUND

Semiconductor memory may be roughly classified into volatile and non-volatile memory devices. Data stored in volatile memory devices is lost when applied power is interrupted, while data stored in non-volatile memory devices is retained under similar conditions.

Flash memory is one type of a non-volatile memory. As computer systems and consumer electronics have become increasingly portable, flash memory has been increasingly used in the implementation of such devices. That is, flash memory has several advantages over other types of memory, such as lower power consumption, higher integration, smaller size, reduced weight, etc. In certain applications, such as portable information appliances including mobile phones, PDAs, digital cameras, etc., flash memory devices have increasingly been used as storage devices instead of hard disk drives.

However, unlike conventional hard disk drive units, flash memory does not readily support a flexible data overwrite function. That is, it is impossible to update previously stored data on less than a defined block-size basis. Accordingly, an erase operation must be performed prior to the programming of data to the flash memory. This approach is commonly referred to as an 'erase-before-program' operation. Using this approach, a flash memory device (or more particularly, a sub-set of the memory cells forming a flash memory device) must be reset to an initial state (e.g., an erase state) prior to programming data.

The erase operation necessitated by this approach requires a longer execution period than the corresponding program operation. Further, since the erase unit (i.e., a defined "block" size) for the flash memory device is generally larger than the corresponding program unit (i.e., a defined "page" size), excess data is inevitably erased and must be restored during a subsequent program operation.

A translation layer (e.g., a Flash Translation Layer or FTL in the context of a flash memory) is specially provided software that is used to address the disadvantages described above. In effect, the FTL allows for the efficient management of data space in a flash memory device by translating logical addresses (LA) from a working file system into corresponding physical addresses (PA). This translation process is commonly referred to as address mapping. For reference purposes hereafter, a logical address LA is an address defined by a file system running on a host device, and a physical address PA is an address defined in relation to the memory cell ordering within a flash memory device.

In many embodiments, the FTL includes an address mapping table managing the address mapping operation. The address mapping table may be loaded to a random access memory (RAM) associated with (or operating in conjunction with) the flash memory device. The address mapping table may be used to store mapping information between corresponding logical and physical addresses. The size of the address mapping table and a mapping manner may be defined in relation to a mapping unit. The host device may recognize the flash memory device as a hard disk drive according to the defined address mapping scheme. Once recognized in this manner, the host device may access the flash memory device as if it were a hard disk drive of conventional design.

Conventionally understood mapping methods include page mapping, block mapping, and hybrid mapping methods. The page mapping method generally requires a page mapping table used to perform a mapping operation according to a defined page unit and to store mapping information between corresponding logical and physical pages. The block mapping method generally requires a block mapping table used to conduct a mapping operation according to a defined block unit and to store mapping information between corresponding logical and physical blocks. The hybrid mapping method may utilize the page and block mapping methods at the same time.

In general, a memory block may consist of several tens or hundreds of pages. For this reason, if the page mapping method is used, the corresponding size of the page mapping table may become excessive as compared with the block mapping method. In other words, the page mapping method may require a much larger memory space for its mapping table.

In contrast, the block mapping method implementing a mapping operation according to a block unit is capable of reducing the size of the corresponding mapping table as compared with the page mapping method. However, since page positions to be written in a block are fixed, many more merge operations may need to be performed.

The hybrid mapping method may utilize the page mapping method with respect to log blocks and the block mapping method with respect to data blocks. Since the hybrid mapping method uses the two mapping methods, a size of a mapping table and the number of merge operations may be reduced.

When a write operation is performed using the hybrid mapping method, page data to be stored in a data block is first stored in a log block, and previous data of a data block is marked as invalid. As the write operation(s) is (are) performed, the resulting "invalid region" may increase in size. Since data may not be stored in the invalid region, the overall data storage capacity of the flash memory device is reduced. In order to maintain an acceptable data storage capacity for the flash memory device, valid pages are gathered within a new data block, and invalid pages are erased. This approach is commonly referred to as a merge operation.

Each merge operation will generally require a plurality of page program operations and a plurality of block erase operations. Thus, merge operations tend to be relatively long. As the number of necessary merge operations increases, the overall performance of a memory system incorporating the constituent flash memory deteriorates.

SUMMARY OF THE INVENTION

Embodiments of the invention are directed to semiconductor memory devices and related block merge methods capable of performing a block merge operation during background operating periods.

In one embodiment, the invention provides a memory system comprising a flash memory device comprising a plurality of memory blocks implementing a plurality of data blocks, a plurality of log blocks, and a plurality of free blocks. The memory system further comprises a flash translation layer maintaining the number of the free blocks to be at least equal to a reference number by converting selected memory blocks among the data and log blocks into free blocks via at least one merge operation during a background period. Additionally, the flash translation layer converts selected ones of the free blocks into data and log blocks, respectively.

In another embodiment, the invention provides a block merge method performed in a memory system comprising a flash memory device including a plurality of memory blocks implementing a plurality of data blocks, a plurality of log blocks, and a plurality of free blocks. The block merge method comprises comparing the number of the free blocks to a reference number, selecting log and data blocks of the memory blocks to be merged when the number of the free blocks is less than the reference number, and increasing the number of the free blocks to at least the reference number by converting the selected log and data blocks into free blocks using at least one merge operation during a background period of the flash memory device.

BRIEF DESCRIPTION OF THE FIGURES

Embodiments of the invention will be described with reference to the accompanying drawings, in which like reference symbols indicate like or similar elements, components, or steps throughout the drawings unless otherwise specified. In the drawings.

DESCRIPTION OF EMBODIMENTS

Embodiments of the invention will be described herein with reference to the accompanying drawings, which show a flash memory device as an example for describing structural and operational features of the invention. The present invention may, however, be embodied in different forms without departing from the scope of the invention, as defined by the accompanying claims.

In accordance with at least one embodiment of the invention, a block merge operation may be conducted during background time in a memory system. As used herein, "background time" is a time period during which no input or output operations (e.g., write or read operations) are being performed in a flash memory device and no requests for such operations are either received from a file system or remain outstanding. In addition, background time may be interrupted if an input/output request is received from the file system. In accordance with at least one embodiment of the invention, it may be possible to prevent the number of free blocks in a memory system from dropping below a desired number by merging data block(s) and log block(s) assigned to the respective data block(s) before a read or write operation is requested by a file system.

Figure 1:
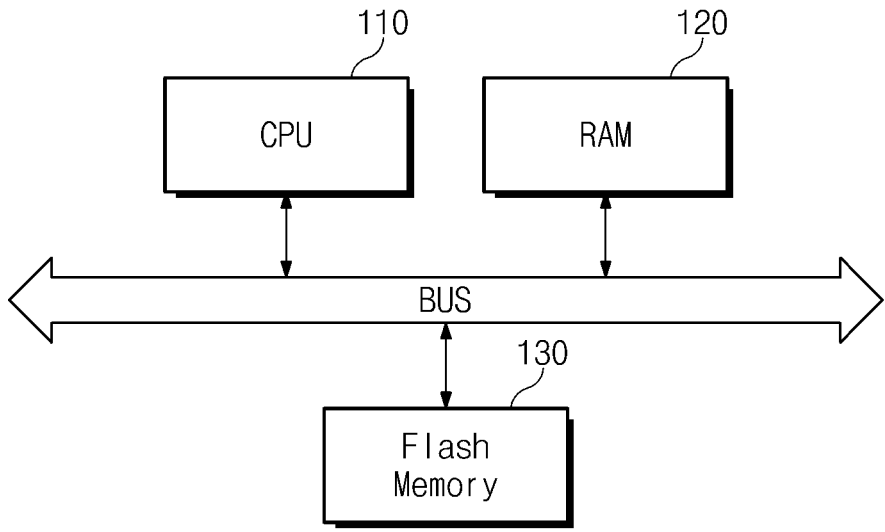
FIG. 1 is a block diagram illustrating a hardware structure of a memory system using a flash memory device.

FIG. 1 is a block diagram illustrating a hardware structure of a memory system 100 using a flash memory device. Referring to FIG. 1, a memory system 100 may comprise a central processing unit (CPU) 110, a random access memory (RAM) 120, and a flash memory device 130.

Flash memory device 130 may comprise a plurality of memory cells arranged in strings, as is well known in the art. A set of memory cells is called a memory cell array. The memory cell array has a plurality of memory blocks, each of which comprises a plurality of pages. In addition, each of the pages comprises a plurality of memory cells sharing a word line.

In the example of flash memory device 130, read and program operations are performed on different units of memory cells in the memory cell array compared to erase operations. That is, flash memory device 130 performs read and write operations in page units and performs erase operations in block units. Further, unlike other semiconductor memory devices, flash memory device 130 does not support overwriting. Accordingly, flash memory device 130 performs an erase operation prior to performing a write operation.

Due to the above-described characteristics of flash memory device 130, separate management is required with respect to read, write, and erase operations to use flash memory device 130 like a hard disk. FTL is a type of software that has been developed for such separate management. FTL may be loaded into RAM 120 and used there.

Figure 2:
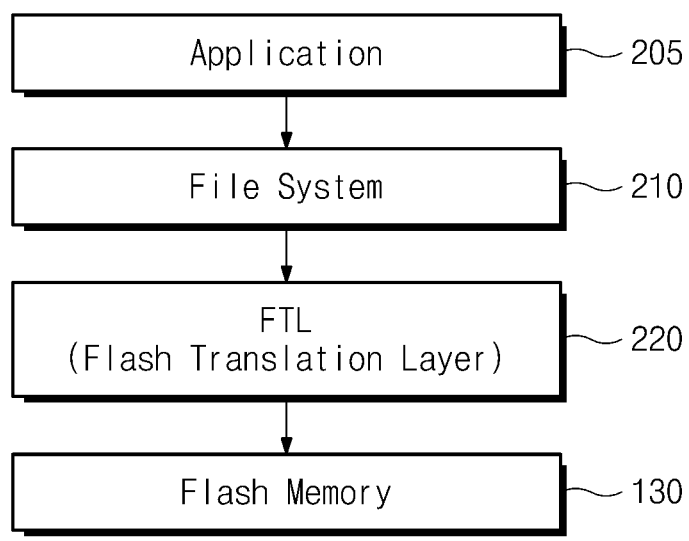
FIG. 2 is a block diagram conceptually illustrating an implementation of software in the memory system of FIG. 1.

FIG. 2 is a block diagram conceptually illustrating an implementation of software in memory system 100 of FIG. 1. Referring to FIG. 2, a memory system may implement software including an application 205, a file system 210, and a FTL 220. As illustrated in FIG. 2, application 205 communicates with file system 210, file system 210 communicates with FTL 220, and FTL 220 communicates with flash memory device 130 of memory system 100.

FTL 220 receives a logical address LA from file system 210 and translates the received logical address LA into a physical address PA. Physical address PA may be provided to flash memory device 130, and flash memory device 130 may access memory cells corresponding to the received physical address PA. In addition, FTL 220 may comprise an address mapping table for address conversion. The address mapping table may be loaded onto RAM 120 from flash memory device 130, and the address mapping table may used in RAM 120.

Address mapping methods of FTL 220 may be classified according the mapping unit used by the respective methods. Representative address mapping methods may include a page mapping method, a block mapping method, and a hybrid mapping method.

A page mapping method performs address mapping operations using page units. Since the page mapping method uses addresses of page units, the page mapping method does not need a merge operation for page arrangement. On the other hand, the page mapping method requires a relatively large address mapping table. Thus, a relatively large amount of the storage capacity of RAM 120 may be needed to implement the page mapping method. As a result, while the page mapping method has the advantage that it does not require merge operations, it has the disadvantage that a relatively large amount of the storage capacity of RAM is needed to implement the page mapping method.

The block mapping method performs address mapping operations using block units. The block mapping method is capable of reducing the amount of RAM required as compared with the page mapping method. On the other hand, the block mapping method requires many merge operations for page arrangement.

The hybrid mapping method utilizes both the page mapping method and the block mapping method. The hybrid method, which will be described further below, enables the size of a mapping table and the number of merge operations to be reduced.

Figure 3:
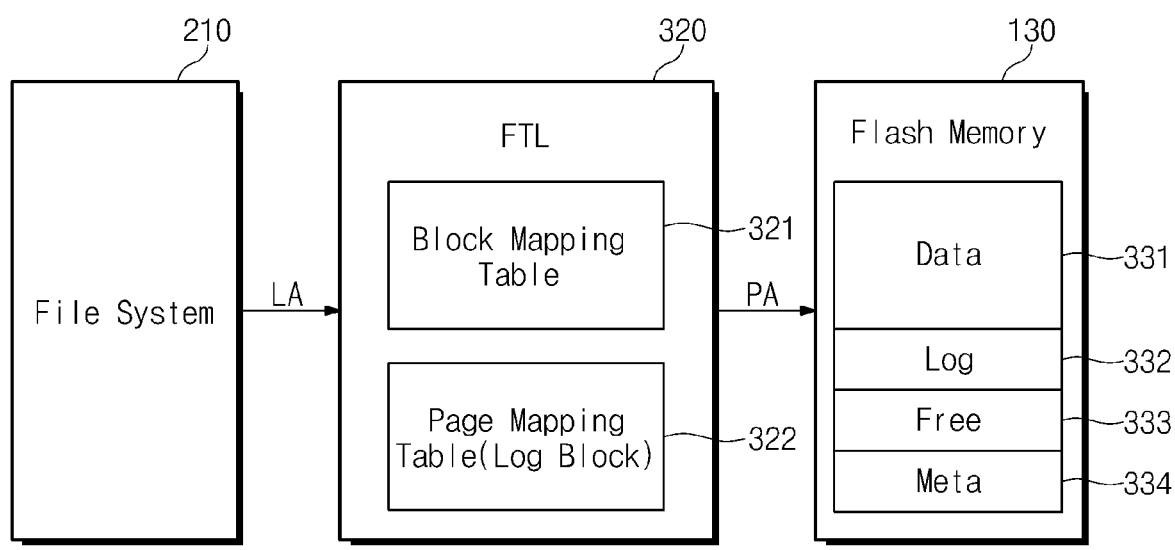
FIG. 3 is a block diagram conceptually illustrating an implementation of a hybrid mapping method in a memory system corresponding to FIGS. 1 and 2.

FIG. 3 is a block diagram conceptually illustrating an implementation of a hybrid mapping method in memory system 100 corresponding to FIGS. 1 and 2. FIG. 3 illustrates file system 210, a FTL 320, and flash memory device 130. In the embodiment illustrated in FIG. 3, FTL 320 receives a logical address LA from file system 210 and converts the received logical address LA into a physical address PA using mapping tables 321 and 322.

As illustrated in FIG. 3, FTL 320 may comprise a block mapping table 321 and a page mapping table 322. Block mapping table 321 is used to convert a logical block number (LBN) into a physical block number (PBN), and page mapping table 322 is used for page mapping of log blocks. Page mapping table 322 is used to convert a logical page number (LPN) into a physical page number (PPN).

Still referring to FIG. 3, flash memory device 130 comprises a plurality of memory blocks implementing at least a plurality of data blocks, a plurality of log blocks, and a plurality of free blocks. In addition, flash memory device 130 may conceptually comprise a data region 331, a log region 332, a free region 333, and a meta region 334. Flash memory device 130 may not have physical data, log, and free regions. Rather, the data blocks, log blocks, and free blocks implemented in flash memory device 130 may conceptually form data region 331, log region 332, and free region 333, respectively. While those regions may be conceptual rather than physically identifiable regions in flash memory device 130, the conceptual regions are still illustrated and referred to herein. Data region 331 comprises the plurality of data blocks and stores user data, and log region 332 comprises the plurality of log blocks, each of which is assigned to one or more of the data blocks of flash memory device 130.

In the hybrid mapping method, when data is to be written to a specific data block, the data is not necessarily written directly to the data block, but may be written to a log block assigned to the data block. If there are no available pages within the log block, valid pages within the log block and valid pages within the data block may be copied into a new data block via a merge operation.

Free region 333 comprises the plurality of free blocks, each of which may be converted into a log block or a data block. For example, if all log blocks assigned to a data block are used, then a free block may be converted into a log block, which may then be assigned to the data block. Additionally, data and log blocks erased after a merge operation may be converted into free blocks, and may subsequently be converted into data and/or log blocks in accordance with assigning operations. Mapping information changed in accordance with a merge operation may be stored in meta region 334.

Figure 4:
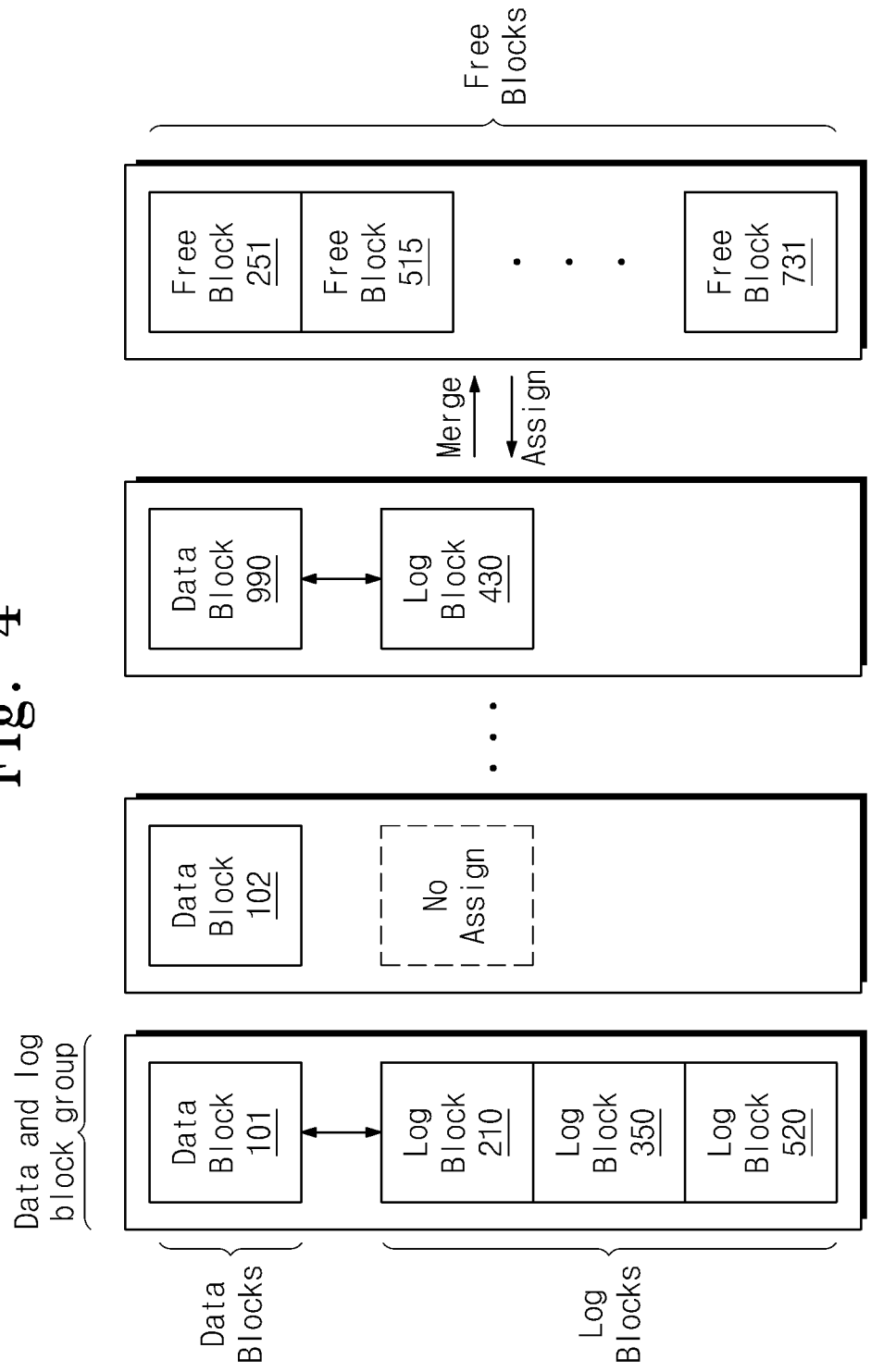
FIG. 4 is a block diagram conceptually illustrating a use of memory blocks in the hybrid mapping method corresponding to FIG. 3, in accordance with an embodiment of the invention.

FIG. 4 is a block diagram conceptually illustrating a use of memory blocks in the hybrid mapping method corresponding to FIG. 3. Referring to FIGS. 3 and 4, flash memory device 130 may have a data region 331 formed of a plurality of data blocks, a log region 332 formed of a plurality of log blocks, and a free region 333 formed of a plurality of free blocks. In the example of FIG. 4, data region 331 of flash memory device 130 may include data blocks having Physical Block Numbers 101, 102, and 990, respectively, as well as other data blocks having Physical Block Numbers between 102 and 990. As used herein, a memory block (e.g., a data block, a log block, or a free block) may be referred to by its Physical Block Number. For example, as used herein, "data block 101" means a data block having the Physical Block Number 101.

One or more log blocks may be assigned to each of the data blocks. In addition, a data block may not have any log blocks assigned to it. In the example of FIG. 4, log blocks 210, 350, and 520 are assigned to data block 101, and a log block 430 is assigned to a data block 990. However, no log block is assigned to data block 102 of FIG. 4. In addition, in the example of FIG. 4, free region 333 of flash memory device 130 comprises free blocks 251, 515, and 731, as well as additional free blocks having physical block numbers between 515 and 731.

Referring to FIG. 4, a plurality of log blocks can be assigned to a data block. That is, it is possible to use a plurality of physical blocks (e.g., data block 101 and log blocks 210, 350, and 520) to implement one logical block. In the hybrid mapping method corresponding to FIG. 4, only page data belonging to data block 101 may be stored in log blocks 210, 350, and 520. That is, in the hybrid mapping method corresponding to FIG. 4, "N" log blocks are assigned to 1 data block (wherein "N" is an integer greater than or equal to 1), so log blocks are assigned to data blocks N:1. However, embodiments of the invention are not limited to that ratio. Rather, a log block may be assigned to more than one data block. Thus, in accordance with an embodiment of the invention, "N" log blocks may be assigned to one or more among "M" data blocks (wherein "M" is an integer greater than or equal to 1).

FIG. 4 also illustrates a data and log block group. As used herein, a "data and log block group" includes a data block and the log blocks assigned to that data block. Because a log block may be assigned to more than one data block, multiple data and log block groups may overlap. That is, when a log block is assigned to more than one data block, that log block is a part of more than one data and log block group. Additionally, as used herein, when a data and log block group is said to be selected "for conversion into free blocks," it means that the data and log blocks in that data and log block group are selected for conversion into free blocks. Also, as used herein, selecting a data and log block group to be merged means that the data and log blocks in that data and log block group are selected to be merged.

If file system 210 requires a write operation with respect to a specific data block, FTL 320 checks whether there is a log block assigned to that data block. If there is a log block assigned to that data block, and the assigned log block includes usable pages, data may be stored in the assigned log block. But, if there is no log block assigned to that data block, or there are no usable pages within the assigned log block, then a new log block may be assigned to the data block.

The number of free blocks may be reduced via block assignment. A block assigning operation may convert a free block into a log block. If the number of free blocks in flash memory 130 is insufficient, a merge operation may be performed to generate additional free blocks. That is, a data block and log blocks assigned to the data block may be converted into free blocks via a merge operation. The merge operation will be described further with reference to FIG. 5.

Figure 5:
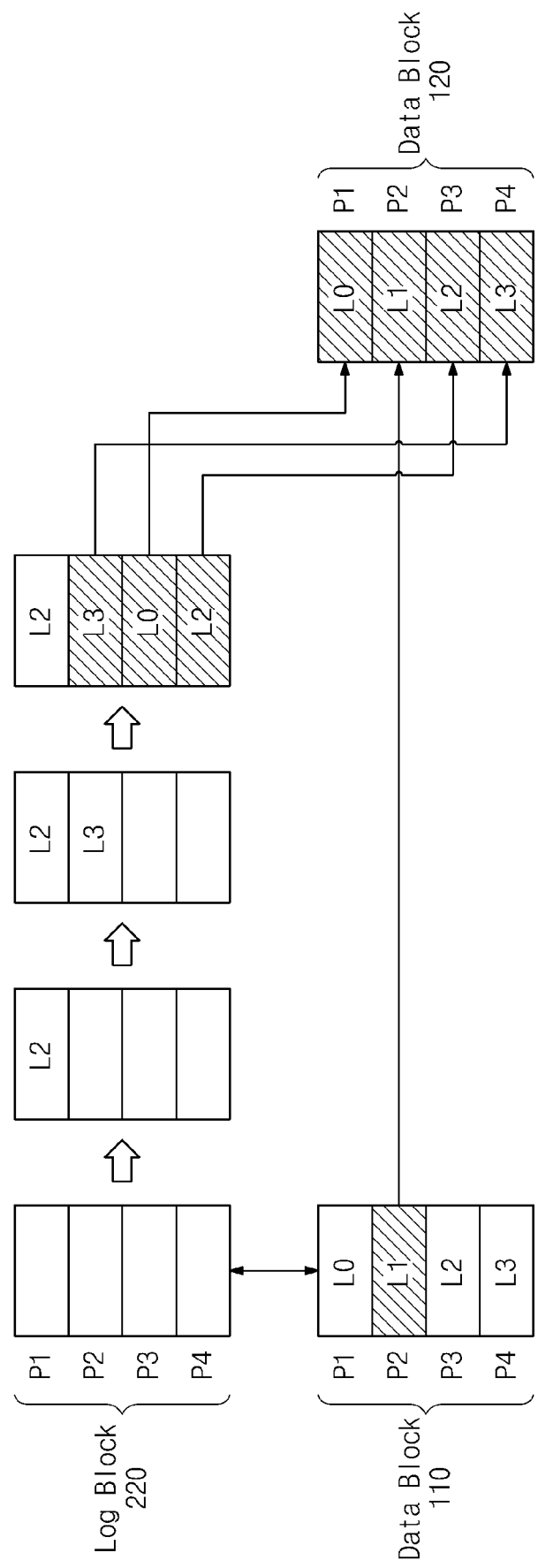
FIG. 5 is a schematic diagram illustrating a merge operation merging data and log blocks.

FIG. 5 is a schematic diagram illustrating a merge operation merging data and log blocks. For convenience of description, it is assumed that one log block is assigned to one data block. However, multiple log blocks may be assigned to one data block. That is, log blocks may be assigned to data blocks as illustrated in the example of FIG. 4.

Referring to FIG. 5, it is assumed that a log block 220 is assigned to a data block 110 and that each of data block 110 and log block 220 has four physical pages P1 through P4.

Before the merge operation is performed, data is stored in data block 110 and log block 220. Specifically, data corresponding to logical pages L0, L1, L2, and L3 is stored in physical pages P1, P2, P3, and P4, respectively. Then, in response to write requests from file system 210, FTL 320 performs page write operations with respect to log block 220 assigned to data block 110. Referring to FIG. 5, file system 210 requests a series of write operations, including write operations for logical pages L2, L3, L0, and another write operation for logical page L2, in that order.

After storing data corresponding to logical pages L0, L1, L2, and L3 in physical pages P1, P2, P3, and P4 of data block 110, respectively, when a write operation for logical page L2 is requested, a write operation is performed with respect to physical page P1 of log block 220. Then, when the write operation for logical page L3 is requested, a write operation is performed with respect to physical page P2 of the log block 220. Next, when the write operation for logical page L0 is requested, a write operation is performed with respect to physical page P3 of log block 220. Then, when the write operation for logical page L2 is requested, a write operation is performed with respect to physical page P4 of the log block 220.

As each write operation is carried out, the number of usable pages within a log block may be reduced. If the number of usable pages within the log block is insufficient, FTL 320 may convert data block 110 and log block 220 into free blocks. That is, a merge operation may be performed. In the merge operation, the data corresponding to logical pages L3, L0, and L2 (which is stored in physical pages P2, P3, and P4 of log block 220) and the data corresponding to logical page L1 (which is stored in physical page P2 of data block 110) are copied to a new data block 120.

The merge operation mentioned above will now be described in more detail. First, data corresponding to logical page L0 (which is stored in physical page P3 of log block 220) is copied to a physical page P1 of new data block 120. Data corresponding to logical page L1 (which is stored in physical page P2 of data block 110) is copied to a physical page P2 of new data block 120. In addition, data corresponding to logical pages L2 and L3 (which is stored in physical pages P4 and P2 of log block 220, respectively) is copied to physical pages P3 and P4 of new data block 120, respectively. Then, log and data blocks 220 and 110 may be erased. Thus, data and log blocks 110 and 220 may be converted into free blocks via a merge operation, and, accordingly, the number of free blocks is increased.

Since free blocks are converted into data and/or log blocks as needed, an appropriate number of free blocks must be retained. The number of free blocks may be reduced by the assignment of log blocks to data blocks (i.e., converting free blocks into log blocks) and may be increased via the merge operation. Accordingly, it is necessary to increase the number of free blocks via the merge operation when the number of free blocks falls below what is considered to be an appropriate number of free blocks.

However, performing merge operations may reduce the overall performance of the flash memory device because the time taken to complete a write operation is delayed by the time taken to perform the merge operation. Thus, in accordance with at least one embodiment of the invention, it is possible to secure the appropriate number of free blocks by performing merge operations during background time (e.g., before a write operation is requested). If an appropriate number of free blocks is maintained, then performing a merge operation when a write operation is requested by the file system may not be necessary. Thus, the overall performance of the flash memory device or memory system may be improved.

Figure 6:
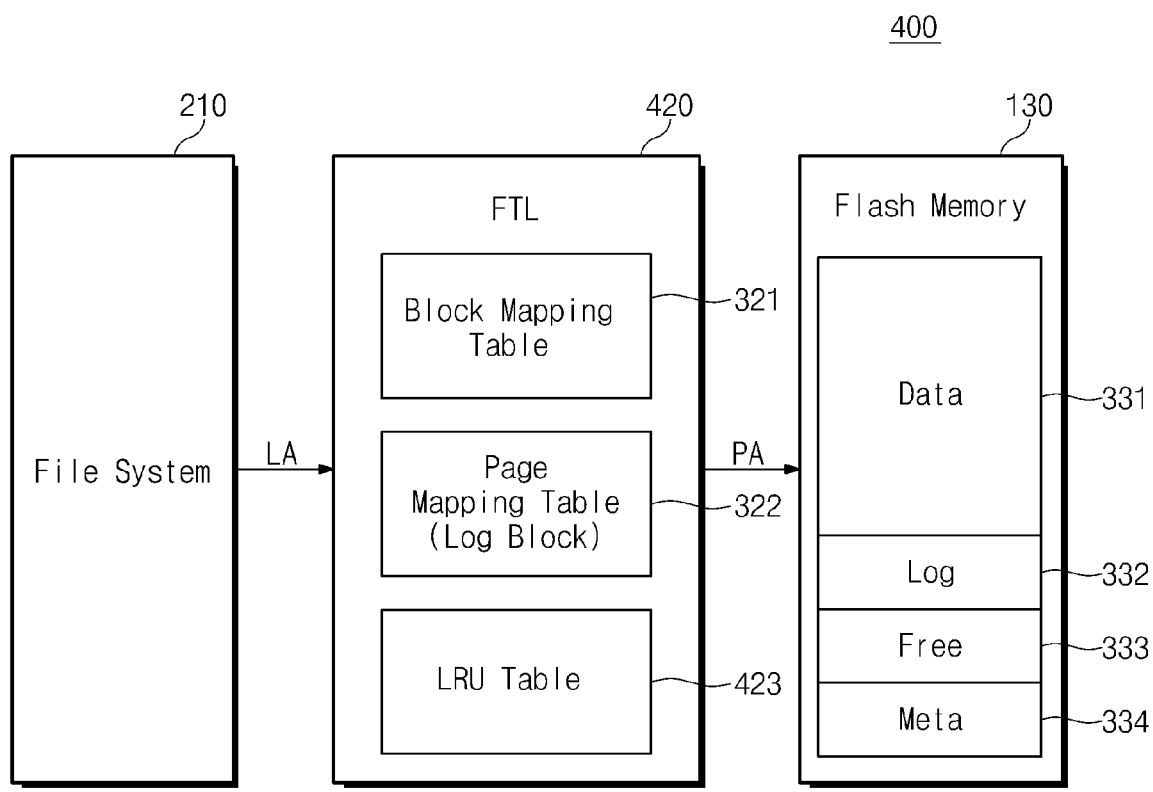
FIG. 6 is a block diagram conceptually illustrating an implementation of a block merge method in a memory system in accordance with an embodiment of the invention.

FIG. 6 is a block diagram conceptually illustrating an implementation of a block merge method in a memory system in accordance with an embodiment of the invention. FIG. 6 illustrates file system 210, a FTL 420, and flash memory device 130.

Flash memory device 130 may comprise a data region 331, a log region 332, a free region 333, and a meta region 334. FTL 420 receives a logical address LA from file system 210 and converts the received logical address LA into a physical address PA using mapping tables. FTL 420 may include a block mapping table 321, a page mapping table 322, and a Least Recently Used (LRU) table 423. Block and page mapping tables 321 and 322 have been described previously with reference to FIG. 3, so further description thereof is omitted here.

LRU table 423 is used to store use information for each memory block. A "use frequency" for each memory block may be detected via the LRU table 423. As described below, the use frequencies of the memory blocks may be used to determine which memory blocks to collect/recover (i.e., convert into free blocks).

Figure 7:
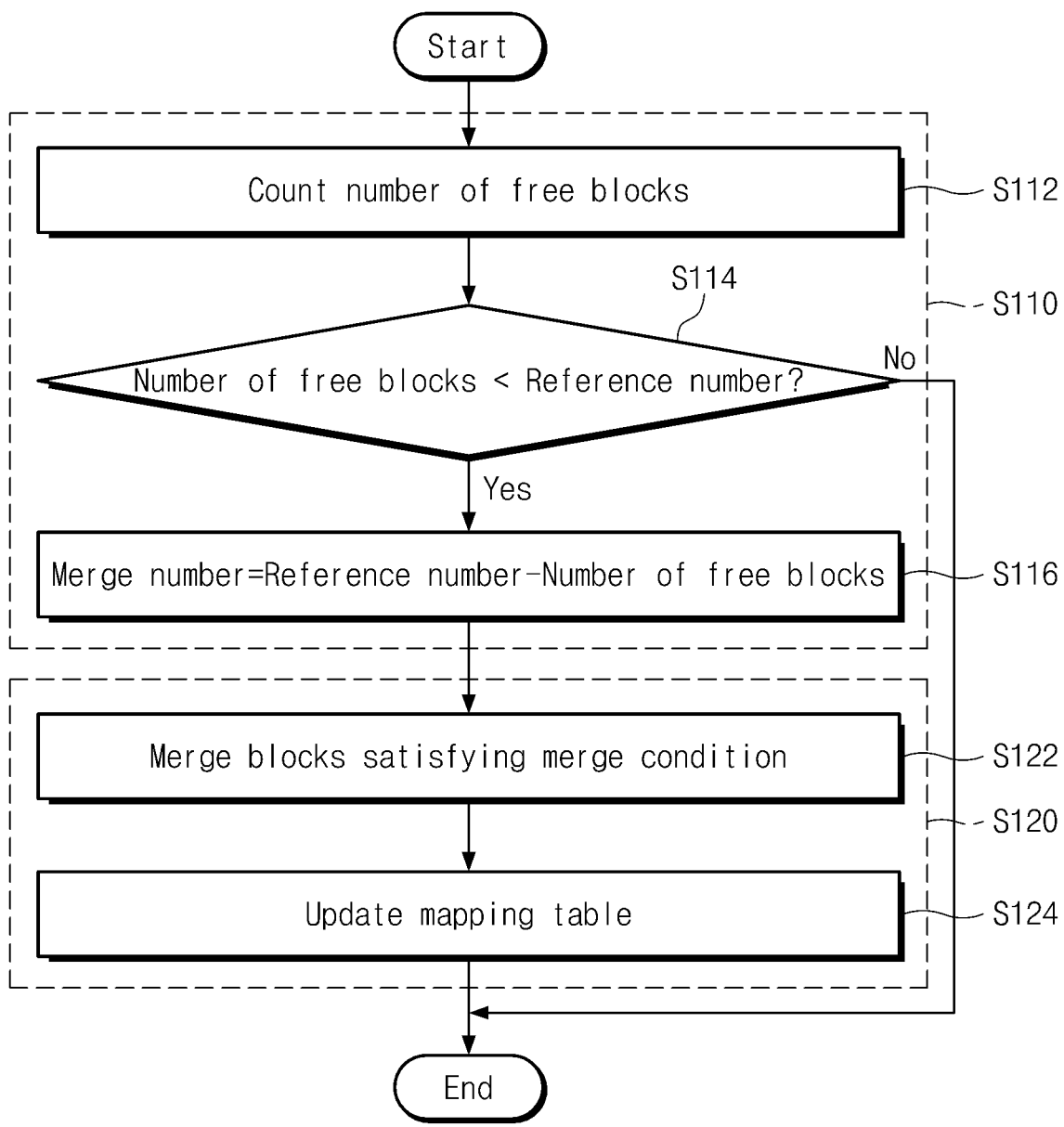
FIG. 7 is a flow chart summarizing a block merge method in accordance with an embodiment of the invention.

FIG. 7 is a flow chart summarizing a block merge method in accordance with an embodiment of the invention. In the embodiment corresponding to FIG. 7, a block merge operation may be carried out during background time.

A block merge operation, in accordance with an embodiment of the invention, may be roughly divided into two phases. In the first phase (S110), the number of blocks to be merged is determined. The first phase may include method steps S112 through S116. In method step S112, FTL 420 counts the number of free blocks. In method step S114, FTL 420 compares the number of free blocks counted in method step S112 (i.e., the number of useable free blocks) with a reference number. The number of free blocks counted in method step S112 may be compared with the reference number during a background period. The reference number indicates the appropriate number of free blocks to retain. In the method corresponding to FIG. 7, the number of free blocks that are retained corresponds to the reference number.

Referring to FIG. 7, after counting the number of free blocks (S112), if the number of free blocks is less than the reference number (S114=yes), then the method proceeds to method step S116 to increase the number of free blocks. In method step S116, FTL 420 determines the number of memory blocks to be merged, which is equal to a difference between the reference number and the number of free blocks counted in method step 112. However, if the number of free blocks is not less than the reference number (S112=no), then increasing the number of free blocks is unnecessary, so a merge operation is not performed.

In accordance with at least one embodiment of the invention, the reference number may be changed dynamically according to certain criteria. For example, the reference number may be increased after a write operation in which a relatively large number of free blocks were converted into log blocks. For example, the reference number may be increased after a write operation in which the reduction in the number of free blocks (e.g., the number of free blocks that were converted into log blocks) is greater than the reference number. If the reduction in the number of free blocks is greater than the reference number, then a relatively large amount of data has been programmed into flash memory device 130. In such a case, it is expected that many free blocks will be required during a next write operation. Thus, many free blocks should be secured. Therefore, the reference number may be increased so that a relatively large number of free blocks will be secured.

As another example, a relatively small number of free blocks may have been changed into log blocks during a previous write operation. For example, the reduction in the number of free blocks (e.g., the number of free blocks that were converted into log blocks) may be less than the reference number. If the reduction in the number of free blocks is less than the reference number, then a relatively small amount of data has been programmed into flash memory device 130. In such a case, it is expected that a relatively small number of free blocks will be required during a next write operation. Thus, it may be unnecessary to retain a relatively large number of free blocks. Thus, the reference number may be reduced.

As described above, it is possible to prevent a merge operation from being performed unnecessarily by adjusting the reference number dynamically according to certain criteria. When the reference number is fixed, however, unnecessary merge operations may be performed to secure many free blocks when only a relatively small number of free blocks are required.

Referring again to FIG. 7, in the second phase (S120), a merge operation is performed with respect to memory blocks. Method step S120 may comprise method steps S122 and S124. In method step S122, memory blocks satisfying merge conditions may be merged. FTL 420 may select memory blocks satisfying merge conditions. The various merge conditions may be established. For example, the number of log blocks assigned to a data block may be used as a measure of which memory blocks should be converted into free blocks using a merge operation. For example, a merge operation should be performed on a first data and log block group comprising a first data block before a merge operation is performed on a second data and log block group comprising a second data block, wherein more log blocks are assigned the first data block than are assigned to the second data block.

Alternatively, a use frequency of a memory block may be used as a measure of which memory blocks should be converted into free blocks using a merge operation. For example, a merge operation should be performed on a first data and log block group before a merge operation is performed on a second data and log block group, wherein the use frequency of the log blocks of the first data and log block group is lower than the use frequency of the log blocks of the second data and log block group. FTL 420 may determine the use frequency of log blocks with reference to LRU table 423. In method step S124, FTL 420 may update mapping tables 321 and 322 based upon the merge operation(s) performed.

The overall performance of a semiconductor memory device (or memory system) may be improved by performing a merge operation(s) during background time. In addition, by dynamically adjusting the number of free blocks that are retained, it may be possible to prevent deterioration of overall performance due to unnecessary merge operations.

Figure 8:
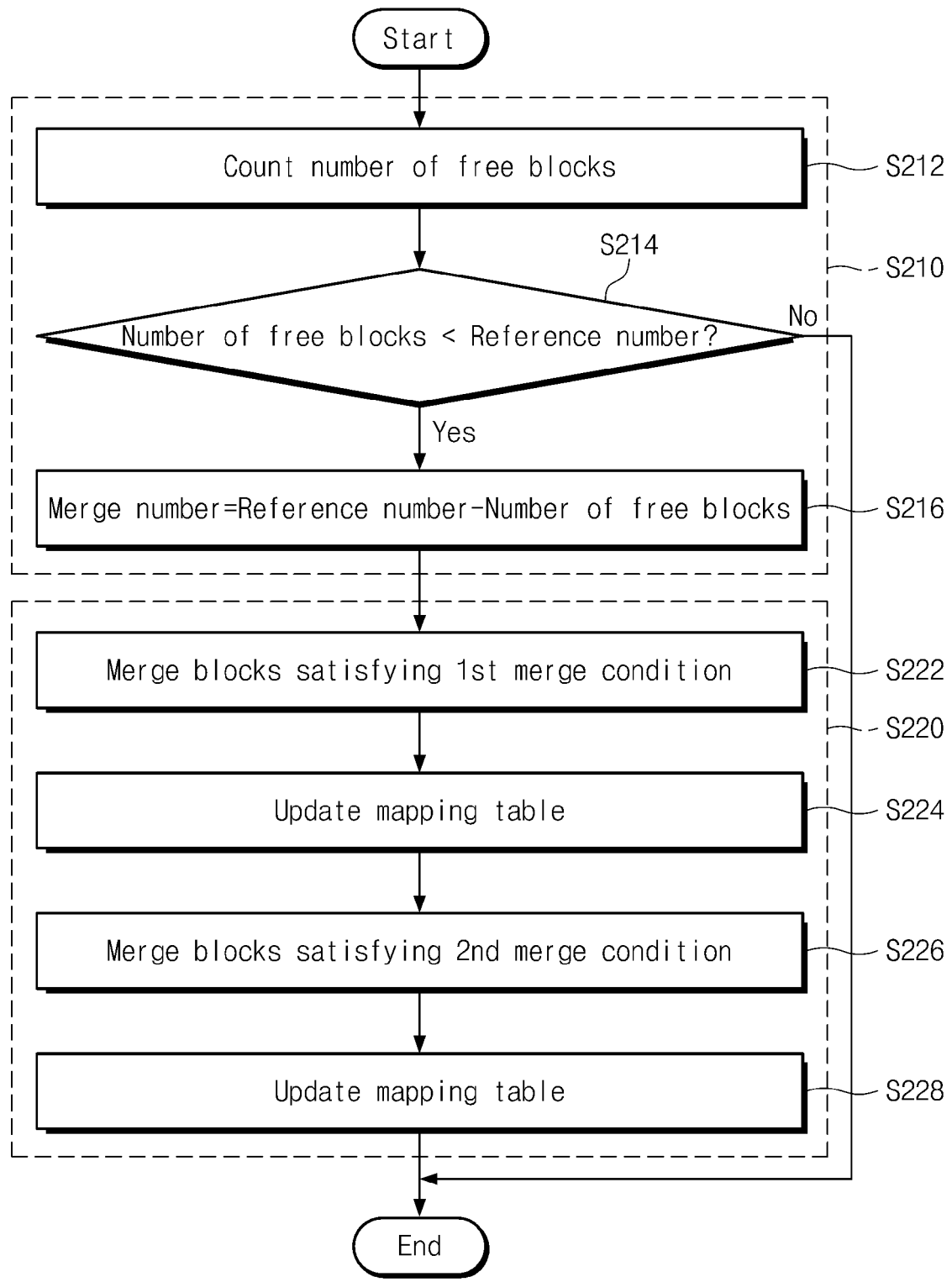
FIG. 8 is a flow chart summarizing a block merge method in accordance with an embodiment of the invention.

FIG. 8 is a flow chart summarizing a block merge method in accordance with another embodiment of the invention. Like the block merge method corresponding to FIG. 7, the block merge method corresponding to FIG. 8 has a first phase (S210) and a second phase (S220).

In the first phase (S210), the number of blocks to be merged is determined. The first phase (S210) comprises method steps S212 through S216, which are substantially the same as method steps S112 through S116 of FIG. 7, so further description of those steps will be omitted here.

In the second phase (S220), a merge operation is performed with respect to memory blocks. The second phase (S220) may comprise method steps S222 through S228. In accordance with at least one embodiment of the invention, in the second phase (S220) memory blocks satisfying a first merge condition and memory blocks satisfying a second merge condition are merged sequentially.

In method step S222, memory blocks satisfying a first merge condition may be merged. FTL 420 may select memory blocks satisfying the first merge condition. The first merge condition may be one of various different conditions. For example, the first merge condition may discriminate between data and log block groups based on the number of log blocks assigned to the data blocks of respective data and log block groups. That is, in accordance with an exemplary first merge condition, a merge operation may be performed on a first data and log block group before a second data and log block group, wherein the number of log blocks assigned to the data block of the first data and log block group is greater than the number of log blocks assigned to the data block of the second data and log block group. In method step S224, FTL 420 may update mapping tables 321 and 322 based on what memory blocks were merged in method step S222.

In method step S226, memory blocks satisfying the second merge condition may be merged. FTL 420 may select memory blocks satisfying the second merge condition to be merged. The second merge condition may be one of various different conditions. For example, the second merge condition may be based on the use frequency of memory blocks. That is, based on an exemplary second merge condition, a merge operation may be performed on a first data and log block group before a second data and log block group, wherein the use frequency of the log blocks of the first data and log block group is lower than the use frequency of the log blocks of the second data and log block group. FTL 420 may detect the use frequency of memory blocks based upon LRU table 423. In method step S228, FTL 420 may update mapping tables 321 and 322 based on which memory blocks were merged in method step S226.

Thus, in the method summarized in FIG. 8, in accordance with an embodiment of the invention, the number of memory blocks to be merged is determined and memory blocks satisfying the first merge condition are then merged. Then, memory blocks satisfying the second merge condition are merged. The number of memory blocks merged in accordance with the second merge condition is the difference between the total number of memory blocks to be merged and the number of memory blocks merged in accordance with the first merge condition.

While embodiments of the invention have been described above, modifications and/or enhancements may be made to those embodiments, and other embodiments may be made, all without departing from the scope of the invention, as defined by the accompanying claims.

What is claimed is:

1. A memory system comprising:
a flash memory device comprising a plurality of data blocks and a plurality of free blocks; and
a memory controller for driving a flash translation layer (FTL) configured to maintain a number of free blocks at least equal to a reference number by converting selected data blocks among the data blocks into free blocks using at least one merge operation during a background period, and further configured to convert selected free blocks of the free blocks into data blocks, respectively, wherein the FTL is configured to adjust the reference number in accordance with a change in the number of the free blocks.

2. The memory system of claim 1, wherein the FTL is further configured to increase the reference number when a reduction in the number of the free blocks is greater than a reference value.

3. The memory system of claim 1, wherein the FTL is further configured to reduce the reference number when a reduction in the number of the free blocks is less than a reference value.

4. A memory system comprising:
a flash memory device comprising a plurality of data blocks and a plurality of free blocks; and
a memory controller for driving a flash translation layer (FTL) configured to maintain a number of free blocks at least equal to a reference number by converting selected data blocks among the data blocks into free blocks using at least one merge operation during a background period, and further configured to convert selected free blocks of the free blocks into data blocks, respectively,
wherein the FTL selects at least a portion of the data blocks as the selected data blocks based upon a use frequency of the data blocks,
wherein the FTL selects a first data block group as the portion prior to a second data block group, the first data block group comprises first data blocks of the plurality of data blocks and the second data block group comprises second data blocks of the plurality of data blocks, and the first data blocks have a lower use frequency than the second data blocks.

5. The memory system of claim 4, wherein the FTL refers to a Least Recently Used (LRU) table to determine the use frequency of the data blocks.

6. The memory system of claim 4, wherein the FTL is further configured to compare the number of free blocks with the reference number to determine whether to perform the at least one merge operation.

7. A memory system comprising:
a flash memory device comprising a plurality of data blocks and a plurality of free blocks; and
a memory controller for driving a flash translation layer (FTL) configured to maintain a number of free blocks at least equal to a reference number by converting selected data blocks among the data blocks into free blocks using at least one merge operation during a background period, and further configured to convert selected free blocks of the free blocks into data blocks, respectively,
wherein the FTL selects at least a portion of the data blocks as the selected data blocks based upon a use frequency of the data blocks,
wherein the FTL selects a first data block group as the portion prior to a second data block group, the first data block group comprises first data blocks of the plurality of data blocks and the second data block group comprises second data blocks of the plurality of data blocks, and the first data blocks have a lower use frequency than the second data blocks,
wherein the FTL adjusts the reference number in accordance with a change in the number of the free blocks.

8. A memory system comprising:
a flash memory device comprising a plurality of data blocks and a plurality of free blocks; and
a memory controller for driving a flash translation layer (FTL) configured to maintain a number of free blocks at least equal to a reference number by converting selected data blocks among the data blocks into free blocks using at least one merge operation during a background period, and further configured to convert selected free blocks of the free blocks into data blocks, respectively,
wherein the FTL selects at least a portion of the data blocks as the selected data blocks based upon a use frequency of the data blocks,
wherein the FTL selects a first data block group as the portion prior to a second data block group, the first data block group comprises first data blocks of the plurality of data blocks and the second data block group comprises second data blocks of the plurality of data blocks, and the first data blocks have a lower use frequency than the second data blocks,
wherein the FTL is configured to copy at least one page of the selected data blocks to the selected free blocks and mark the copied at least one page of the selected data blocks as an invalid page in the at least one merge operation.

9. The memory system of claim 8, where the FTL is further configured to erase the at least one page marked as the invalid page for increasing the number of the free blocks in the at least one merge operation.

10. The memory system of claim 8, where the FTL is further configured to update a mapping table which maps a logical address of the at least one page on a physical address of the at least one page after converting the selected data blocks into free blocks.

* * * * *